United States Patent [19]

Komeya et al.

[11] 4,097,293

[45] Jun. 27, 1978

[54] METHOD FOR MANUFACTURING HEAT-RESISTANT REINFORCED COMPOSITE MATERIALS

[75] Inventors: Katsutoshi Komeya, Kawasaki; Hiroshi Inoue, Kawaguchi, both of Japan

[73] Assignee: Tokyo Shibaura Electric Co., Ltd., Kawasaki, Japan

[21] Appl. No.: 708,354

[22] Filed: Jul. 26, 1976

Related U.S. Application Data

[63] Continuation of Ser. No. 270,543, Jul. 10, 1972, abandoned, which is a continuation-in-part of Ser. No. 31,345, Apr. 23, 1970, abandoned.

[30] Foreign Application Priority Data

Apr. 30, 1969 Japan .................................. 44-32734
May 2, 1969 Japan .................................. 44-33552
Apr. 28, 1970 United Kingdom ............... 20413/70

[51] Int. Cl.² ........................ C04B 35/52; C04B 35/70
[52] U.S. Cl. .................................... 106/43; 106/73.2; 106/73.4; 106/73.5; 264/60; 264/65
[58] Field of Search .......................... 264/60, 65, 332; 106/43, 44, 55, 73.2, 73.4, 73.5

[56] References Cited

U.S. PATENT DOCUMENTS 3,108,887   10/1963   Lenie et al. ............................. 264/65

OTHER PUBLICATIONS

"Dense Silicon Nitride," Deeley et al., Powder Metallurgy, 1961, No. 8, pp. 145-151.

*Primary Examiner*—Donald J. Arnold
*Attorney, Agent, or Firm*—Carroll F. Palmer

[57] ABSTRACT

A method for manufacturing heat-resistant reinforced composite materials having a fibrous structure which comprises mixing 99.8 to 90 percent by weight of a first component selected from the group consisting of the nitrides or carbides of aluminum, silicon and boron and mixtures thereof and 0.2 to 10 percent by weight of a second component selected from the group consisting of the rare earth oxides and mixtures thereof, molding the mixture into a desired shape, and sintering the molded mass to create a fibrous structure therein, said first component being 0.2 to 3.0 microns in average particle size, and said second component being 0.1 to 2.0 microns in average particle size.

8 Claims, 1 Drawing Figure

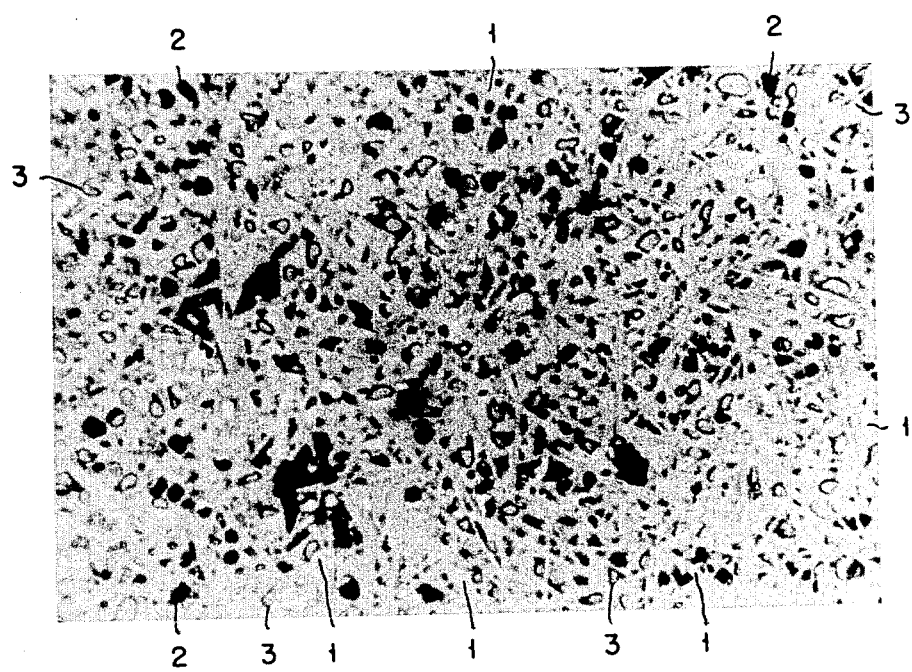

METHOD FOR MANUFACTURING HEAT-RESISTANT REINFORCED COMPOSITE MATERIALS

CROSS-REFERENCE TO RELATED APPLICATION

This is a continuation, of application Ser. No. 270,543, filed July 10, 1972 now abandoned and which is a continuation-in-part of the U.S. Pat. application Ser. No. 31,345 filed on Apr. 23, 1970 now abandoned.

BACKGROUND OF THE INVENTION

The present invention relates to a method for manufacturing heat-resistant reinforced composite materials containing a fibrous structure.

In recent years, there has grown strong demand for heat-resistance materials to have greater high temperature strength and thermal shock resistance as is the case with the parts of a space craft and heat-resistant jigs. And there have been developed a large variety of new composite materials in response to such demand. Among them, composite materials prepared with a fibrous structure by reinforcing the matrix with inorganic heat-resistant fibres promise wide applications in various fields due to excellent mechanical and thermal properties.

The most common practice heretofore known to prepare such fibre-containing heat-resistant composite materials has been separately to produce inorganic fibres in advance and incorporate them in a matrix, followed by hot press sintering. However, this prior art process involves severe operating conditions, for example, that the inorganic fibre and matrix are inherently difficult to react with each other, so that they have to be brought to a sufficiently wettable state before being bonded together. Moreover, the conventional process is encountered with other technical problems which still remain to be resolved. Another known method proposed for the manufacture of fibre-reinforced heat-resistant composite materials comprises isotropic solidification utilizing a eutectic reaction between the materials used. With this process, however, the selection of starting materials to be used is subject to a certain limitation. Further, said process involves the solidification of a dissolved mass, so that it can not be deemed fully advantageous from either a technical or practical point of view.

SUMMARY OF THE INVENTION

The present invention has been accomplished in view of the aforementioned situation and is to provide a method for the manufacture of fibre-reinforced heat-resistant composite materials, which simply consists of steps of molding powdered raw materials, and sintering the mold.

The heat-resistant reinforced composite material according to the present invention is suited particularly to gas turbine materials for use at a high temperature of 900° – 1200° C such as for example static blades (nozzles) and movable blades etc; due to an excellent impact resistance as well as an excellent resistance to corrosion and oxidation; due to a high strength and an excellent strength at a high temperature as well as a strength responsible for the uniformity of fibres; and due to a relatively uniform density as well as easiness in manufacture.

In more detail, the method of the present invention comprises mixing 99.8 to 90 percent by weight of a first component selected from the group consisting of the nitrides or carbides of aluminum, silicon and boron and mixtures thereof, said first component being 0.2 to 3.0 microns in average particle size and 0.2 to 10 percent by weight of a second component selected from the group consisting of oxides of scandium, yttrium and elements of the lanthanum series and mixtures thereof, said second component being 0.1 to 2.0 microns in average particle size; molding the mixture; and sintering the molded mass in a non-oxidizing atmosphere at temperatures falling within the proper sintering temperature of any of the materials constituting the aforesaid first component.

Scandium, yttrium and elements of the lanthanum series are generally referred to as the rare earth elements. The second component selected from the group consisting of oxides of scandium, yttrium and elements of the lanthanum series and mixtures thereof may be alternatively expressed as a second component selected from the group consisting of the rare earth oxides and mixtures thereof.

BRIEF EXPLANATION OF THE DRAWING

The appended drawing is a 500 times magnified microscopic photograph illustrating the crystal structure of a composite material obtained by the method of the present invention.

DETAILED DESCRIPTION OF THE INVENTION

The method of the present invention comprises blending the first and second components of proper proportions to form a powdered mixture, preferably adding to the mixture a small amount of ordinary binder such as stearic acid or paraffin, molding the mass with pressure, and sintering it in a non-oxidizing atmosphere such as nitrogen, ammonia gas or inert gas to create a fibrous structure therein. The fibrous crystals thus formed have so good cohesion to the matrix that the resultant composite material displays extremely great flexural strength.

The fibrous crystals are formed during the sintering process from the first component and the matrix is a liquid-phase low-melting-point compound freshly formed by a reaction between the first and second components. In the present invention, the heat-resistant reinforced composite materials having a fibrous structure are so arranged that the matrix is embedded between the fibrous crystals. However, if the second component exceeds 10% by weight based on the total weight of the first and second components there is formed an excess matrix, the excess portion of which is flowed out from between fibrous crystals. As a result, the composite material so formed assumes an unsightly outward appearance. In addition it is also difficult to manufacture sintered parts, either complicate-shaped or large-sized. On the other hand, if the second component is less than 0.2% by weight based on the total weight of the first and second components no desired fibrous structure can be obtained. The result of experiments conducted reveals that the amount of the second component is most preferably in the range of 0.2 – 8% by weight.

In a case where the average particle size of the first component is more than 3.0 microns or where the average particle size of the second component is more than 2.0 microns no fibrous structure is formed, and it is impossible to increase the mechanical strength of the composite material. On the other hand, in a case where the average particle size of the first component is less than 0.2 micron or where the average particle size of the second component is less than 0.1 micron, a fibrous structure can be obtained, but difficulty will be presented in commercially preparing particles having such fine size.

When AlN was particularly selected out of the first component in association with the second component and 0.5 - 10% by weight of AlN content was substituted by powdered silicate as the third component, formation of AlN fibrous crystals was facilitated. As a result, it was observed that a mechanical strength was further increased. From this it will be understood that the third component acts on a matrix portion formed by reaction between the first and second components and facilitates formation of the AlN fibrous crystals. That is, in the ternary mixture consisting of 99.3 - 80% by weight of the first component; 0.2 - 10% by weight of the second component and 0.5 - 10% by weight of the third component, if the content of the third component exceeds 10 wt% it is agglomerated as an impurity. The agglomeration of the third component gives rise to the surface irregularity of the resultant composite material. In addition a drop in mechanical strength, as well as a greater dispersion in values of strength results. There may be used as a silicate for the third component, $SiO_2$-bearing materials such as aluminum silicate, magnesium silicate, calcium silicate, silicon dioxide, feldspar, pyroxene, olivine, mice etc. The average particle size of these third component materials is preferably in the range of 0.1 - 2.5 microns.

For the purpose of the present invention, it is preferred that sintering be carried out at temperatures falling within the proper sintering temperature of any of the materials constituting the first component, or as listed below:

| | |
|---|---|
| Aluminum nitride | 1600 to 2200° C |
| Silicon nitride | 1500 to 1900° C |
| Boron nitride | 1700 to 2200° C |
| Aluminum carbide | 1700 to 2300° C |
| Silicon carbide | 1600 to 2200° C |
| Boron carbide | 1800 to 2200° C |

The atmosphere in which sintering is performed preferably consists of nitrogen, ammonia gas, inert gas or other non-oxidizing gaseous mixtures containing any of them. Further, it is desired that the atmosphere used in said sintering be of such type as does not release free oxygen during the sintering process.

The present invention will be more clearly understood from the examples which follow.

EXAMPLE 1

To a mixture of 90% by weight aluminum nitride powders having an average particle size of 1.2 microns and 10% by weight yttrium oxide powders having an average particle size of 1.6 microns there was added stearic acid as a binder in amount equal to 8% by weight based on the total weight of said mixed powders. The mass was molded at a pressure of 5 ton/cm² into a large number of rods 8 mm in diameter and 15 mm long. These rods molded from powders were placed in a carbon muffle kiln filled with aluminum nitride powders as a packing material. Sintering was conducted in streams of nitrogen supplied at the rate of 800 l/hr by increasing temperature stepwise as given below:

| | |
|---|---|
| Room temperature to 300° C | 2 hours |
| 300 to 400° C | 4 hours |
| 400 to 1700° C | 4 hours |

Sintering was carried out 2 hours at 1700° C, followed by natural cooling. The resultant sintered body had a mechanical strength of 45 Kg/mm² as expressed in terms of flexural strength. The sintered body had such crystal structure that as shown in the microscopic photograph of the drawing, there were formed fibrous crystals 1 (indicated by narrow plain sections) among the matrix sections 2 and 3. Most of the narrow sections were found to consist of aluminum nitride powders 1 to 6 microns wide and 75 to 125 microns long. The matrix sections 2 shown in black and those 3 indicated by round particulate forms were observed to consist of compounds (Yttrium aluminum garnet: $Y_3Al_5O_{12}$) containing aluminum and yttrium. It was confirmed that the presence of said fibrous crystals 1 prominently elevated the mechanical strength of the composite material.

In this example, since the content of yttrium oxide is 10% by weight which corresponds to the upper limit of the second component, there was produced between the first and second components a liquid-phase yttrium aluminum garnet ($Y_3Al_5O_{12}$), part of which was flowed out from between the fibrous crystals. As a result, some irregular or nonuniform portions were observed on the surface of the resultant composite material.

It may be said in this connection that a composite material comprising aluminum nitride or yttrium oxide used singly which was sintered in the same manner as in the preceding case had a flexural strength of 8 to 13 Kg/mm².

EXAMPLE 2

In this Example, an experiment was conducted in a similar way as in Example 1 by varying the composition, mixed ratio and average particle size of the first and second components. To the mixture of the first and second components in powdered form was added a binder, and the mass was molded at a pressure of 5 ton/cm² into sample rods 8 mm in diameter and 15 mm long. The molded samples were placed in carbon muffle kilns filled with powders representing the corresponding first components used as packing. Each sample was heated in streams of argon gas supplied at the rate of 200 l/hr up to a prescribed temperature by raising it at the rate of 100° C per hour. Sintering was conducted 2 hours at said prescribed temperature, followed by natural cooling, the properties of the sintered samples being presented in Table I below. The mark O denotes the presence of a fibrous formation.

Table I

| Sample No. | Component 1st | Component 2nd | Particle size (μ) 1st | Particle size (μ) 2nd | Proportions (wt %) 1st | Proportions (wt %) 2nd |
|---|---|---|---|---|---|---|
| 1 | $Si_3N_4$ | $Y_2O_3$ | 0.9 | 0.6 | 97 | 3 |
| 2 | $Si_3N_4$ | $Y_2O_3$ | " | " | 92 | 8 |
| 3 | AlN | $Y_2O_3$ | 1.2 | 0.8 | 99 | 1 |
| 4 | AlN | $Y_2O_3$ | " | " | 95 | 5 |
| 5 | AlN | $Y_2O_3$ | " | " | 92 | 8 |
| 6 | AlN | $Y_2O_3$ | " | " | 99 | 1 |
| 7 | AlN | $Y_2O_3$ | " | " | 92 | 8 |
| 8 | AlN | $La_2O_3$ | " | 0.5 | 97 | 3 |
| 9 | AlN | $Ce_2O_3$ | " | 0.9 | " | " |
| 10 | AlN | $Sc_2O_3$ | " | 1.2 | " | " |
| 11 | $Si_3N_4$ | $La_2O_3$ | " | 0.8 | " | " |

Table I-continued

| Sample No. | Component 1st | Component 2nd | Particle size (μ) 1st | Particle size (μ) 2nd | Proportions (wt %) 1st | Proportions (wt %) 2nd |
|---|---|---|---|---|---|---|
| 12 | Si₃N₄ | Sc₂O₃ | " | 1.2 | " | " |
| 13 | SiC | Y₂O₃ | 0.8 | 0.8 | 96 | 4 |
| 14 | SiC | La₂O₃ | " | 0.5 | " | " |
| 15 | BN | Y₂O₃ | 0.5 | " | 95 | 5 |
| 16 | BN | Sc₂O₃ | " | 1.2 | " | " |
| 17 | B₄C | Ce₂O₃ | 1.2 | 0.9 | " | " |
| 18 | B₄C | Y₂O₃ | " | 0.8 | " | " |
| 19 | Al₄C₃ | Y₂O₃ | 1.3 | " | 92 | 8 |
| 20 | Al₄C₃ | Nd₂O₃ | " | 0.3 | " | " |
| 21 | AlN:Si₃N₄ 1:1 | Y₂O₃ | 1.2:0.9 | 0.8 | 97 | 3 |
| 22 | AlN | Y₂O₃:Sc₂O₃ 1:1 | 1.2 | 0.8:1.1 | " | " |

| Sample No. | Sintering Temp. (°C) | Sintering Time (hr) | Flexural Strength (Kg/mm²) | Fibrous Structure | Surface irregularity due to flow of excess matrix |
|---|---|---|---|---|---|
| 1 | 1600 | 2 | 35.0 | 0 | No |
| 2 | " | " | 42.3 | " | " |
| 3 | 1700 | " | 31.3 | " | " |
| 4 | " | " | 44.7 | " | " |
| 5 | " | " | 47.5 | " | " |
| 6 | 1900 | " | 35.2 | " | " |
| 7 | " | " | 41.5 | " | " |
| 8 | 1700 | " | 38.5 | " | " |
| 9 | 1800 | " | 47.1 | " | " |
| 10 | 1700 | " | 41.3 | " | " |
| 11 | 1600 | " | 38.1 | " | " |
| 12 | 1700 | " | 49.3 | " | " |
| 13 | 1800 | " | 37.2 | " | " |
| 14 | " | " | 45.1 | " | " |
| 15 | 1900 | " | 19.7 | " | " |
| 16 | " | " | 21.5 | " | " |
| 17 | 2000 | " | 36.3 | " | " |
| 18 | " | " | 38.0 | " | " |
| 19 | 1800 | " | 38.1 | " | " |
| 20 | " | " | 32.5 | " | " |
| 21 | 1700 | " | 46.2 | " | " |
| 22 | 1800 | " | 45.0 | " | " |

As will be evident from Table I all the sintered samples Nos. 1 - 22 had a fibrous structure and exhibited a high flexural strength. In addition there was hardly observed any flow out of the low-melting-point compound melted during the sintering process.

EXAMPLE 3

To powdered AlN of an average particle size of 0.8μ was added, respectively, 0, 0.1, 0.2, 1, 5, 8, 10 and 11% by weight of powdered Y₂O₃ of an average particle size of 0.5μ. And in accordance with Example 1 sintering was effected 1 hour at a temperature of 1800° C to obtain sintered samples. From the sintered samples the following results were observed. The sintered sample from the addition of 0.1% by weight of the powdered Y₂O₃ was substantially the same in strength as a single AlN sintered body, and exhibited a flexural strength of 12 Kg/mm². And no fibrous structure was obtained. In the sintered samples from the addition of 0.2 - 11% by weight of the powdered Y₂O₃, on the other hand, noticeable results were obtained due to the addition of a second component of Y₂O₃. That is, an increased strength was exhibited and in each of the sintered samples a fibrous structure was formed. This salient increased strength is just ascribable to the addition of the Y₂O₃. However, on the surface of the sintered sample from the addition of 11% by weight of the powdered Y₂O₃ there were deposited aluminum nitride powders used as a packing material. This indicates that some of the compound Y₃Al₅O₁₂ produced by reaction of the first and second components, i.e. the powdered AlN and Y₂O₃, were flowed out during the sintering process. Such flow out of the compound gives a finished article an unsightly outward appearance. In addition, difficulty is also encountered in commercially manufacturing sintered articles, either complicated-shaped or large-sized. The result of the experiments is tabulated in the following Table II in which the marks O and x denote the presence and absence, respectively, of the fibrous formation.

Also to the powdered AlN of an average particle size of 2.2μ was added 1% by weight of powdered Y₂O₃ of an average particle size of 0.5μ as in this Example. And sintering was effected one hour at a temperature of 1800° C to obtain a sintered sample. The sintered sample exhibited a high flexural strength of 38.5 Kg/mm² and, like the above-mentioned AlN of an average particle size of 0.8μ, a fibrous structure was observed.

The same procedure was also conducted by adding powdered Y₂O₃ of an average particle size of 0.2 - 0.3 micron to 0.2 - 10% by weight of Al₄C₃, Si₃N₄, SiC, B₄C and BN, respectively, of an average particle size of 0.2 - 0.3 micron. The resultant samples exhibited a high flexural strength and a fibrous structure was observed for each sample.

Table II

| Sample No. | Component 1st | Component 2nd | Proportions (wt %) 1st | Proportions (wt %) 2nd | Sintering Temp. (°C) | Sintering Time (hr) | Flexural strength | Fibrous structure | Surface irregularity due to flow of excess matrix |
|---|---|---|---|---|---|---|---|---|---|
| 23 | AlN | Y₂O₃ | 100 | 0 | 1800 | 1 | 8.8 | x | No |
| 24 | " | " | 99.9 | 0.1 | " | " | 12 | x | " |
| 25 | " | " | 99.8 | 0.2 | " | " | 33.6 | O | " |
| 26 | " | " | 99 | 1 | " | " | 40.8 | O | " |
| 27 | " | " | 95 | 5 | " | " | 53.6 | O | " |
| 28 | " | " | 92 | 6 | " | " | 59.2 | O | " |
| 29 | " | " | 90 | 10 | " | " | 58.1 | O | Slight |
| 30 | " | " | 89 | 11 | " | " | 57.5 | O | Yes |

EXAMPLE 4

In sintering a mold-compacted powdered mass having a 95 wt% AlN - 5 wt% Y₂O₃ composition, tests were conducted about the variation of the binary-component sintered samples due to variation in particle size using as a first component 0.2, 0.5, 1, 2, 3, 3.2 and 5μ of powdered AlN in combination with, as a second material, 0.1, 0.2, 0.5, 1, 2, 2.2 and 4μ of powdered Y₂O₃. The powdered AlN and Y₂O₃ were each selected to be 20g based on the total weight thereof (for example, 19g AlN and 1g Y₂O₃); and uniformly mixed together in a wet-type mixing method using ethanol as a dispersion solution. To the powdered mixture 5% by weight of stearic acid was added as a binder, and the resultant mixture were molded at a pressure of 2 ton/cm² into rods 8 mm in diameter and 20 mm in length. These rods were placed in a hot stream of nitrogen to raise them up to a temperature of 400° C. After complete removal of the binder used, sintering was conducted by effecting a temperature raising at a rate of 1500° C/hr up to 1800° C and maintaining the temperature for a period of 60 minutes followed by being allowed to be cooled. The results of the experiments were tabulated in Table III.

In Table III test results of a 99 wt% AlN - 1 wt% Y$_2$O$_3$ composition are also included as Sample Nos. 46 – 48.

2.0μ in case of the second component. In Table III the marks O and x denote the presence and absence, respectively, of the fabrous formation.

EXAMPLE 5

Substantially in accordance with the procedure as shown in Example 1 there were prepared 10 samples each consisting of the first component, the second component and the third component. Shown in Table IV below are the composition, particle sizes, proportion, Table III

| Sample No. | Compositon (wt %) | | Particle size (μ) | | Flexural strength (Kg/mm$^2$) | Fibrous structure | Remarks |
|---|---|---|---|---|---|---|---|
| | AlN | Y$_2$O$_3$ | AlN | Y$_2$O$_3$ | | | |
| 31 | 95 | 5 | 0.2 | 0.5 | 58.9 | O | |
| 32 | " | " | 0.5 | " | 61.3 | O | |
| 33 | " | " | 1 | " | 51.2 | O | |
| 34 | " | " | 2 | " | 45.4 | O | |
| 35 | " | " | 3 | " | 42.1 | O | |
| 36 | " | " | 3.2 | " | 25.6 | X | Abrupt drop in strength |
| 37 | " | " | 5 | " | 13.3 | X | |
| 38 | " | " | 0.5 | 0.1 | 63.5 | O | |
| 39 | " | " | " | 0.2 | 61.2 | O | |
| 40 | " | " | " | 1 | 54.5 | O | |
| 41 | " | " | " | 2 | 42.2 | O | |
| 42 | " | " | " | 2.2 | 24.7 | X | Abrupt drop in strength |
| 43 | " | " | " | 4 | 11.5 | X | |
| 44 | " | " | 1 | 0.2 | 52.8 | O | |
| 45 | " | " | 0.2 | 1 | 54.0 | O | |
| 46 | 99 | 1 | 0.5 | 0.5 | 44.5 | O | |
| 47 | " | " | 1 | " | 38.5 | O | |
| 48 | " | " | 0.5 | 1 | 43.7 | O | |

As will be understood from the test results, when the particle size is in the range 0.2 – 3μ in case of AlN and 0.1 – 2μ in case of Y$_2$O$_3$, there is obtained a desirable fibrous structure and thus a sintered sample having a high flexural strength. However, when the upper limit of such particle size is exceeded, formation of a fibrous structure is not attained, resulting in an abrupt drop in flexural strength to a lower value.

The similar tests were also conducted using, as a first component other than AlN, Si$_3$N$_4$, SiC, B$_4$C, BN and Al$_4$C$_3$ in combination with, as a second component other than Y$_2$O$_3$, the rare earth oxides. The test results all reveal that the desirable average particle size is in the range 0.2 – 3.0μ in case of the first component and 0.1 – sintering conditions and properties of each sample. The mark "O" appearing in Table IV denotes the presence of a fibrous formation.

Table IV

| Sample No. | Component | | | Particle size | | | Proportions (wt %) | | |
|---|---|---|---|---|---|---|---|---|---|
| | 1st | 2nd | 3rd | 1st | 2nd | 3rd | 1st | 2nd | 3rd |
| 49 | AlN | Y$_2$O$_3$ | β-quartz | 1.2 | 1.6 | 0.8 | 90 | 5 | 5 |
| 50 | " | " | " | " | " | " | 94 | 1 | " |
| 51 | " | " | " | " | " | " | 84 | 5 | 11 |
| 52 | " | " | " | " | " | " | 85 | " | 10 |
| 53 | " | " | " | " | " | " | 87 | " | 8 |
| 54 | " | " | Al$_6$Si$_2$O$_{13}$ | " | " | 1.0 | 90 | " | 5 |
| 55 | " | " | Mg$_2$SiO$_4$ | " | " | 1.2 | " | " | " |
| 56 | " | La$_2$O$_3$ | β-quartz | " | 1.1 | 0.8 | " | " | " |
| 57 | " | Sc$_2$O$_3$ | " | 0.5 | " | " | " | " | " |
| 58 | " | La$_2$O$_3$:Y$_2$O$_3$ 1:1 | " | " | 1.1:0.8 | " | 96 | 3 | 1 |

| Sample No. | Sintering | | Flexural strength (Kg/mm$^2$) | Fibrous structure | Surface irregularity Due to agglomeration of third component |
|---|---|---|---|---|---|
| | Temp (° C) | Time (minute) | | | |
| 49 | 1800 | 60 | 63.1 | O | No |
| 50 | " | " | 45.8 | O | " |
| 51 | " | " | 46.2 | O | Slight |
| 52 | " | " | 58.5 | O | No |
| 53 | " | " | 65.2 | O | " |
| 54 | " | " | 61.6 | O | " |
| 55 | " | " | 60.8 | O | " |
| 56 | " | " | 55.2 | O | " |
| 57 | " | " | 60.2 | O | " |
| 58 | " | " | 53.5 | O | " |

What we claim is:

1. A method for manufacturing heat-resistant reinforced composite materials having a fibrous structure which comprises:
    A. providing a mixture of:
        (a) 99.8 to 90 percent by weight of a first component selected from the group consisting of nitrides and carbides of aluminum, silicon and boron and mixtures thereof, said first component being 0.2 to 3.0 microns in average particle size, and (b) 0.2 to 10 percent by weight of a second component selected from the group consisting of oxides of scandium, yttrium and elements of the lanthanum series and mixtures thereof, said second component being 0.1 to 2.0 microns in average particle size, B. molding said mixture by pressure into a desired form, and C. sintering the molded mass without application of pressure thereon in at least one gas selected from the group consisting of nitrogen, ammonia and inert gas at a temperature as specified below with respect to the first component contained in said mixture:

aluminum nitride — 1600° to — 2200° C
silicon nitride — 1500° to — 1900° C
boron nitride — 1700° to — 2200° C
aluminum carbide — 1700° to — 2300° C
silicon carbide — 1600° to — 2200° C
boron carbide — 1800° to — 2200° C 2. The method according to claim 1 wherein the first component is aluminum nitride.

3. The method according to claim 1 wherein the second component is yttrium oxide.

4. The method according to claim 1 wherein the first component is silicon nitride.

5. A method for manufacturing heat-resistant reinforced composite materials having a fibrous structure which comprises:

A. providing a mixture of:

(a) 99.3 to 80 percent by weight of a first component having 0.2 to 3.0 microns in average particle size, said first component being aluminum nitride, (b) 0.2 to 10 percent by weight of a second component selected from the group consisting of oxides of scandium, yttrium, and elements of the lanthanum series and mixtures thereof, said second component being 0.1 to 2.0 microns in average particle size, and (c) 0.5 to 10 percent by weight of a third component having 0.1 to 2.5 microns in average particle size, said third component being silicates, B. molding said mixture by pressure into a desired form, and C. sintering the molded mass without application of pressure thereon in at least one gas selected from the group consisting of nitrogen, ammonia and inert gas at a temperature of from 1600° to 2200° C.

6. The method of claim 5 wherein said silicate is selected from the group consisting of aluminum silicate, magnesium silicate, calcium silicate, silicon dioxide, feldspar, pyroxene, olivine and mica.

7. A heat resistive, reinforced article formed of composite material which consists essentially of fibrous crystals of a first component as defined in claim 1 and an amorphous matrix of garnet containing said second component element formed by the method of claim 1.

8. A heat resistive, reinforced article formed of composite material which consists essentially of fibrous crystals of aluminum nitride and an amorphous matrix of garnet containing Sc, Y, or La series elements formed by the method of claim 5.

* * * * *